US011485627B2

(12) United States Patent
Nelson et al.

(10) Patent No.: US 11,485,627 B2
(45) Date of Patent: Nov. 1, 2022

(54) CONVERSION FRAME FOR FUEL DISPENSER

(71) Applicant: S. Bravo Systems, Inc., Commerce, CA (US)

(72) Inventors: Micah Nelson, Commerce, CA (US); Ricardo Burgos, Commerce, CA (US); Don Mukai, Commerce, CA (US)

(73) Assignee: S. BRAVO SYSTEMS, INC., Commerce, CA (US)

(*) Notice: Subject to any disclaimer, the term of this patent is extended or adjusted under 35 U.S.C. 154(b) by 3 days.

(21) Appl. No.: 17/236,319

(22) Filed: Apr. 21, 2021

(65) Prior Publication Data

US 2021/0238023 A1    Aug. 5, 2021

Related U.S. Application Data

(63) Continuation of application No. 16/117,280, filed on Aug. 30, 2018, now Pat. No. 11,014,802.

(51) Int. Cl.
*B67D 7/32*    (2010.01)
*B23P 19/04*   (2006.01)
*B67D 7/78*    (2010.01)

(52) U.S. Cl.
CPC ............ *B67D 7/3209* (2013.01); *B23P 19/04* (2013.01); *B67D 7/78* (2013.01)

(58) Field of Classification Search
CPC ......... Y10T 137/5762; Y10T 137/5907; Y10T 137/6991; Y10T 137/7002; Y10T 137/6995; Y10T 137/7006; B67D 7/3209; B67D 7/78
See application file for complete search history.

(56) References Cited

U.S. PATENT DOCUMENTS

| 5,167,470 | A  | ‡ | 12/1992 | Bertolozzi | B67D 7/84 137/312 |
| 6,986,622 | B2 | ‡ | 1/2006 | Ageheim | F16L 9/19 137/236.1 |
| 11,014,802 | B2 | * | 5/2021 | Nelson | B23P 19/04 |
| 11,267,085 | B2 | * | 3/2022 | Mukai | B23P 6/00 |
| 2010/0206393 | A1 | ‡ | 8/2010 | Saltz | B67D 7/3209 137/312 |

* cited by examiner
‡ imported from a related application

*Primary Examiner* — Daphne M Barry
(74) *Attorney, Agent, or Firm* — Lewis Roca Rothgerber Christie LLP

(57) ABSTRACT

A conversion frame assembly configured to secure a fuel dispenser to a concrete pad and direct leaked fuel from the fuel dispenser into a sump at least partially embedded in the concrete pad. The conversion frame assembly includes a frame having a fluid passageway and a splash lip extending upward from the base plate and around the fluid passageway. The conversion frame assembly also includes a drainage tray configured to be coupled to the splash lip of the frame. When the drainage tray is coupled to the splash lip of the frame, an upper surface of the drainage tray defines a weir sloping inward and downward toward the fluid passageway in the base plate.

20 Claims, 10 Drawing Sheets

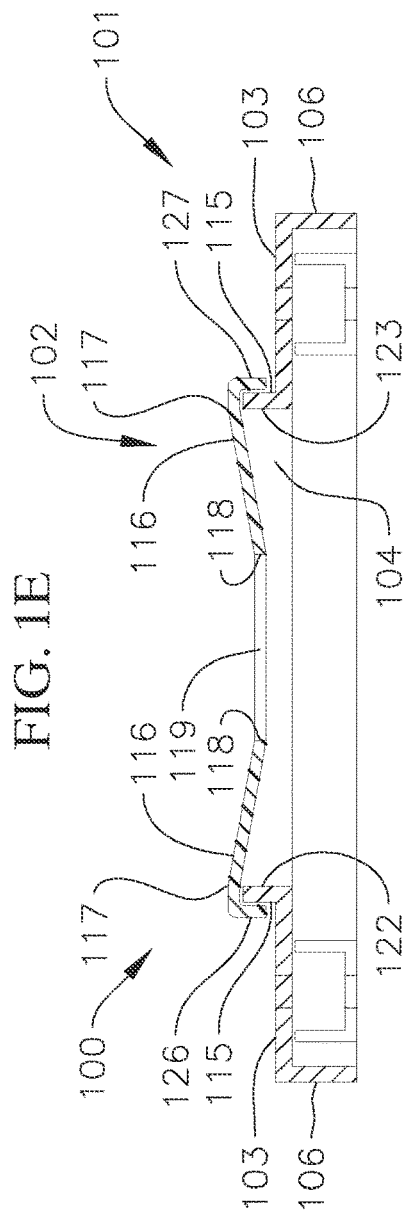

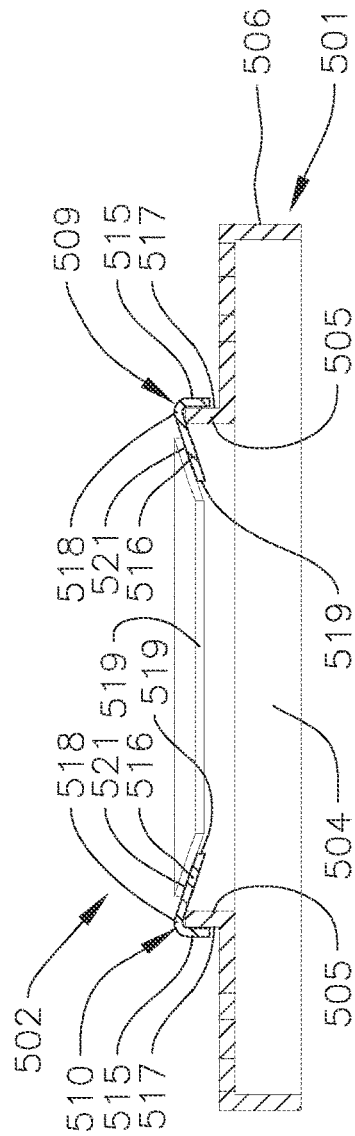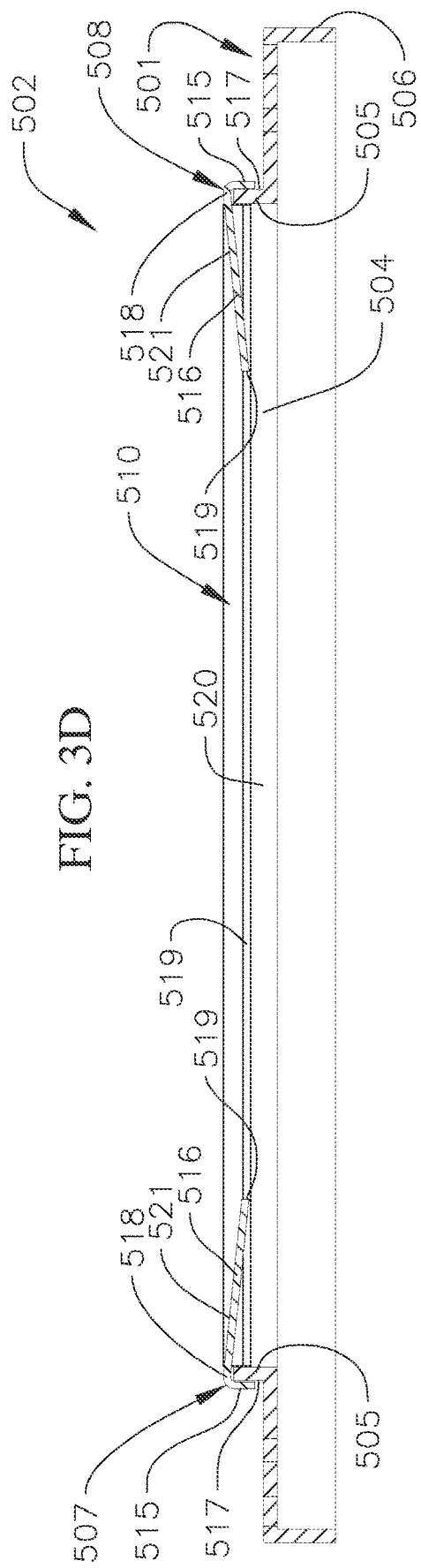

CONVERSION FRAME FOR FUEL DISPENSER

CROSS-REFERENCE TO RELATED APPLICATION

This application is a continuation of U.S. patent application Ser. No. 16/117,280, filed Aug. 30, 2018 with the U.S. Patent and Trademark Office, the entire content of which is incorporated herein by reference.

FIELD

The present disclosure relates to conversion frames from fuel dispensers.

BACKGROUND

At gasoline service stations and other fueling facilities, under dispenser containment (UDC) units are provided under the fuel dispensers to contain and prevent contamination from fuel that leaks from the fuel dispensers. The UDC units are typically sized to correspond to the size of the fuel dispensers. However, UDC units are embedded in a concrete pad at the fueling facility and typically have a longer service life than the fuel dispensers, and therefore the fuel dispensers are commonly replaced before the UDC units. Additionally, new fuel dispensers typically have a different footprint than the older fuel dispensers and this creates a size disparity between the new fuel dispenser and the UDC unit which was sized for the original fuel dispenser. This size disparity can leave components in the fuel dispenser that are prone to leaking, such as filters, fuel meters, and threaded pipe connections, protruding past the opening of the UDC unit, which renders the UDC unit ineffective at containing potential fuel leaks and thereby creates a risk to the environment.

To mitigate these leaks when a new fuel dispenser is installed, conversion frames are typically installed between the new fuel dispenser and the UDC unit. However, conventional conversion frames are typically custom fabricated based on the model of the new fuel dispenser, the model of the old fuel dispenser, and the length and width of the opening of the UDC unit. Acquisition of this information typically requires a certified technician to conduct an in-person site survey to take physical measurements of the dispenser cabinets and to locate model numbers on antiquated equipment. Accordingly, custom fabrication of conventional conversion frames is both time-consuming and costly.

Additionally, conventional conversion frames are commonly not anchored to the concrete pad around the UDC unit or to the fuel dispenser. Instead, new fuel dispensers commonly rest on their own weight on the concrete pad without any anchoring or are secured only to the existing UDC unit, which frequently has extensive rust damage. Accordingly, conventional conversion frames that do not anchor the fuel dispenser to the concrete pad pose a safety hazard in the event of a car collision at the gasoline service station.

SUMMARY

The present disclosure is directed to various embodiments of a conversion frame assembly configured to secure a fuel dispenser to a concrete pad and direct leaked fuel from the fuel dispenser into a sump at least partially embedded in the concrete pad. In one embodiment, the conversion frame assembly includes a frame having a base plate with a fluid passageway, and a splash lip extending upward from the base plate and around the fluid passageway. The conversion frame assembly also includes a drainage tray configured to be coupled to the splash lip of the frame. When the drainage tray is coupled to the splash lip of the frame, an upper surface of the drainage tray defines a weir sloping inward and downward toward the fluid passageway in the base plate.

The conversion frame assembly may include an opening in the drainage tray having a configuration corresponding to a configuration of the sump.

The drainage tray may be a different material than the frame.

The drainage tray may be plastic, thin sheet steel, or fiber reinforced plastic.

The base plate may include a first set of openings configured to receive fasteners securing the frame to the concrete pad.

The base plate may include a second set of openings configured to receive fasteners securing the frame to the fuel dispenser.

The conversion frame assembly may include a series of brackets configured to reinforce the frame at locations proximate to the first set of openings in the base plate.

The frame may include a standoff flange extending downward from the base plate.

A conversion frame assembly according to another embodiment of the present disclosure includes a frame having a base plate with a fluid passageway and a splash lip extending upward from the base plate and extending around the fluid passageway in the base plate. The conversion frame assembly also includes a drainage tray having a series of angled segments configured to be coupled to the splash lip of the frame. When the series of angled segments are coupled to the splash lip of the frame, the series of angled segments define an opening and upper surfaces of the series of angled segments cooperate to define a weir sloping inward and downward toward the opening.

Each angled segment of the series of angled segments may include an attachment lip and a drainage lip connected to the attachment lip. When the drainage tray is coupled to the frame, the attachment lip of each angled segment is coupled to the splash lip of the frame, and the drainage lip of each angled segment extends inward and downward from the splash lip.

The base plate may include a first set of openings configured to receive fasteners securing the frame to the concrete pad.

The base plate may include a second set of openings configured to receive fasteners securing the frame to the fuel dispenser.

The conversion frame assembly may include a series of brackets configured to reinforce the frame at locations proximate to the first set of openings in the base plate.

The frame may include a standoff flange extending downward from the base plate.

The present disclosure is also directed to various method of retrofitting an existing sump at least partially embedded in a concrete pad at a fueling station to contain leaks from a new fuel dispenser that is larger or smaller than an old dispenser for which the sump was designed. In one embodiment, the method includes installing a frame of a conversion frame assembly to the concrete pad around the sump, coupling a drainage tray of the conversion frame assembly to the frame, and forming an opening in the drainage tray having a configuration based on a configuration of an open upper end of the sump.

The method may also include installing the new fuel dispenser to the frame of the conversion frame assembly.

Forming the opening in the drainage tray may include cutting the opening in the drainage tray.

The drainage tray may be plastic, thin sheet steel, or fiber reinforced plastic.

The drainage tray may include a series of angled segments, and forming the opening may include selecting a configuration of the series of angled segments and coupling the series of angled segments to a splash lip of the frame.

The method may also include removing a splash lip of the sump before installing the conversion frame assembly.

This summary is provided to introduce a selection of concepts that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 1B-1F are an exploded perspective view, an assembled perspective view without an opening formed therein, an assembled perspective view with an opening formed therein, and longitudinal and transverse cross-sectional views, respectively, of the embodiment of the conversion frame assembly illustrated in FIG. 1A;

FIGS. 3A-3D are an exploded perspective view, an assembled perspective view, a transverse cross-sectional view, and a longitudinal cross-sectional view, respectively, of a conversion frame according to a further embodiment of the present disclosure.

DETAILED DESCRIPTION

The present disclosure is directed to various embodiments of a conversion frame configured to anchor a fuel dispenser to a concrete pad or island at a gasoline fueling station or other fueling facility, and direct fuel that leaks from various components inside the hydraulic cabinet of the fuel dispenser into an under dispenser containment (UDC) unit (e.g., a containment box) at least partially embedded in the concrete pad. The conversion frame is also configured to direct any other liquid passing through the interior of the fuel dispenser into the UDC unit. The conversion frames of the present disclosure are configured to retrofit existing UDC units to work with new fuel dispensers that have a different footprint than the original fuel dispenser for which the UDC unit was designed to work. The configuration (e.g., size and shape) of an opening in the conversion frames of the present disclosure size is selectable during installation of the conversion frame depending on the configuration of the opening in the existing UDC unit. Accordingly, the conversion frames of the present disclosure are universal for a given fuel dispenser model, regardless of the model of the original fuel dispenser and the size of the existing UDC unit.

Figure 1A:
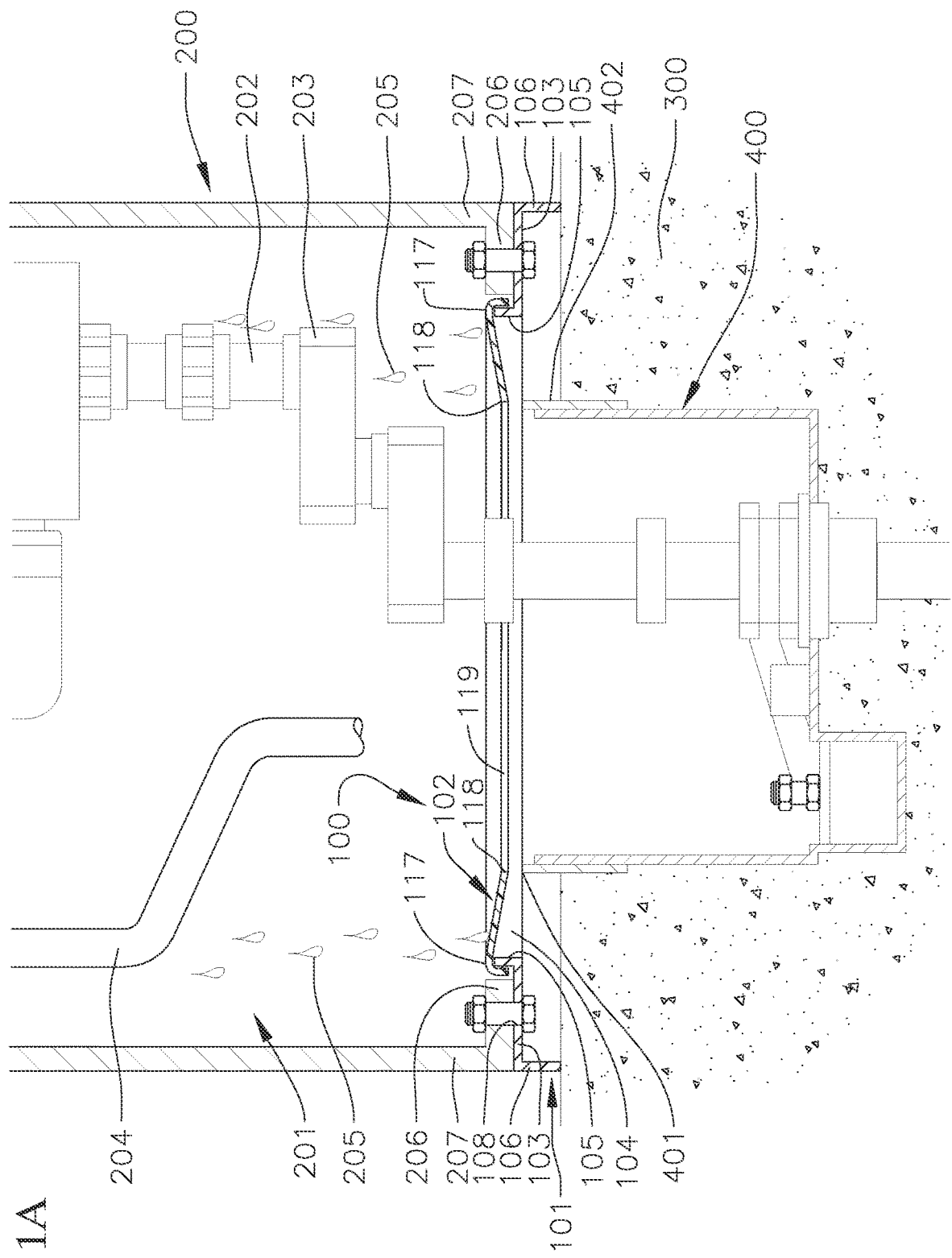
FIG. 1A is a cross-sectional view of a conversion frame assembly according to one embodiment of the present disclosure showing the conversion frame assembly securing a fuel dispenser to a concrete landing above a dispenser sump.

FIG. 1A depicts a conversion frame assembly 100 according to one embodiment of the present disclosure securing a fuel dispenser 200 at a gasoline fueling station or other fueling facility to a concrete pad 300 or concrete island at the fueling facility. FIG. 1A also depicts an under dispenser containment (UDC) unit 400 (e.g., a dispenser sump or containment box) located below the fuel dispenser 200 and at least partially embedded in the concrete pad 300. The fuel dispenser 200 has a hydraulic cabinet 201 including various hydraulic components for dispensing fuel, including a motor, a pump, valves, pipes 202, filters, fuel meters, threaded pipe connections 203, and a vapor line 204. The UDC unit 400 has an open upper end 401 and the UDC unit 400 is configured to collect and contain fuel that leaks from one or more of the components of the hydraulic cabinet 201 of the fuel dispenser 200 and thereby prevent ground contamination. Additionally, in the illustrated embodiment, a splash lip 402 of the UDC unit 400 protrudes out of the concrete pad 300 and is configured to mitigate against the intrusion of water into the UDC unit 400.

In the illustrated embodiment, the cross-sectional size of the fuel dispenser 200 (i.e., the footprint of the fuel dispenser 200) is larger than the open upper end 401 of the UDC unit 400 (e.g., the width of the fuel dispenser 200 is larger than the width of the UDC unit 400). The disparity between the size of the fuel dispenser 200 and the size of the UDC unit 400 may be due, for instance, to the fuel dispenser 200 being a new fuel dispenser (e.g., a replacement or an upgraded fuel dispenser) that is larger than the original fuel dispenser for which the UDC unit 400 was designed. Due to the size disparity, various components in the hydraulic cabinet 201 of the fuel dispenser 200 that are prone to leaking, such as the filters, the fuel meters, the pipes 202, the threaded pipe connections 203, and/or the vapor line 204 extend outward beyond the open upper end 401 of the UDC unit 400 (e.g., one or more components in the hydraulic cabinet 201 of the fuel dispenser 200 that are prone to leaking, or at least a portion thereof, is not aligned above the open upper end 401 of the UDC unit 400).

The conversion frame assembly 100 is configured to channel or direct fuel 205 that leaks from one or more of the components in the hydraulic cabinet 201 of the fuel dispenser 200 into the open upper end 401 of the UDC unit 400. In this manner, the conversion frame assembly 100 is configured to contain the leaked fuel 205 which might otherwise leak onto the concrete pad 300 and/or into the ground due the size disparity between the fuel dispenser 200 and the UDC unit 400.

With reference now to FIGS. 1B-1F, the conversion frame assembly 100 according to one embodiment of the present disclosure includes a frame 101 and a drainage tray 102 configured to be attached to the frame 101. In the illustrated embodiment, the frame 101 includes a base plate 103 defining a fluid passageway 104, a splash lip 105 extending upward from the base plate 103 and around the fluid passageway 104, and a standoff flange 106 extending downward from the base plate 103 and around an outer periphery of the base plate 103. In the illustrated embodiment, the fluid passageway 104 in the base plate 103 is larger than the UDC unit 400 (e.g., the length and width of the fluid passageway 104 in the frame 101 are larger than the length and width of the UDC unit 400) such that the base plate 103 of the frame 101 is configured to extend around the splash lip 402 of the UDC unit 400, as illustrated in FIG. 1A. The splash lip 105 of the frame 101 is configured to mitigate against the intrusion of water (e.g., water which leaks into an interior of the fuel dispenser 200) into the UDC unit 400 through the open upper end 401 of the UDC unit 400. In one or more embodiments, the splash lip 105 of the frame 101 has a height of at least approximately ½ inch. In one or more embodiments, the splash lip 105 of the frame 101 has a height of at least approximately ¾ inch. In one or more embodiments, the splash lip 105 of the frame 101 may have any other height suitable for mitigating against the intrusion of water into the UDC unit 400.

The base plate 103 of the frame 101 includes a first set of openings 107 (e.g., holes) configured to receive fasteners (e.g., concrete anchor bolts) securing the frame 101 to the concrete pad 300. In one or more embodiments, the configuration (e.g., number and arrangement) of the first set of openings 107 in the base plate 103 corresponds to the configuration (e.g., the number and arrangement) of the fasteners that are used to secure the frame 101 to the concrete pad 300. The configuration of the first set of openings 107 clears the existing UDC 400 and ensures the frame 101 is secured to the concrete pad 300. Additionally, in the illustrated embodiment, the base plate 103 of the frame 101 defines a second set of openings 108 (e.g., holes) configured to receive fasteners (e.g., anchor bolts) securing the frame 101 to a return flange 206 at a base or lower end 207 of the new fuel dispenser 200. The configuration (e.g., the number and arrangement) of the second set of openings 108 corresponds to the configuration of the bolt pattern in the base 207 of the new fuel dispenser 200. Accordingly, the configuration of the second set of openings 108 in the base plate 103 varies depending on the type of fuel dispenser 200 with which the conversion frame assembly 100 is utilized. In one or more embodiments, the first set of openings 107 includes from 2 to 8 openings for receiving fasteners securing the frame 101 to the concrete pad 300, and the second set of openings 108 includes from 2 to 8 openings for receiving fasteners securing the frame 101 to the new fuel dispenser 200. In the illustrated embodiment, the configuration of the first set of openings 107 is different than the configuration of the second set of openings 108, which enables replacement of an old fuel dispenser with a new fuel dispenser having a different configuration of fastener attachment points (e.g., a different footprint than the old fuel dispenser).

In the illustrated embodiment, the standoff flange 106 is configured to raise the base plate 103 of the frame 101 off of the concrete pad 300. Additionally, in the illustrated embodiment, the height of the standoff flange 106 is at least as tall as the height of the splash lip 402 of the UDC unit 400 such that the frame 101 is configured to clear the splash lip 402 of the UDC unit 400. In one or more embodiments, the height of the standoff flange 106 is at least approximately 1 inch (e.g., at least approximately 2 inches), although in one or more embodiments, the standoff flange 106 may have any other suitable height depending on the size of the splash lip 402 of the UDC unit 400.

Figure 2:
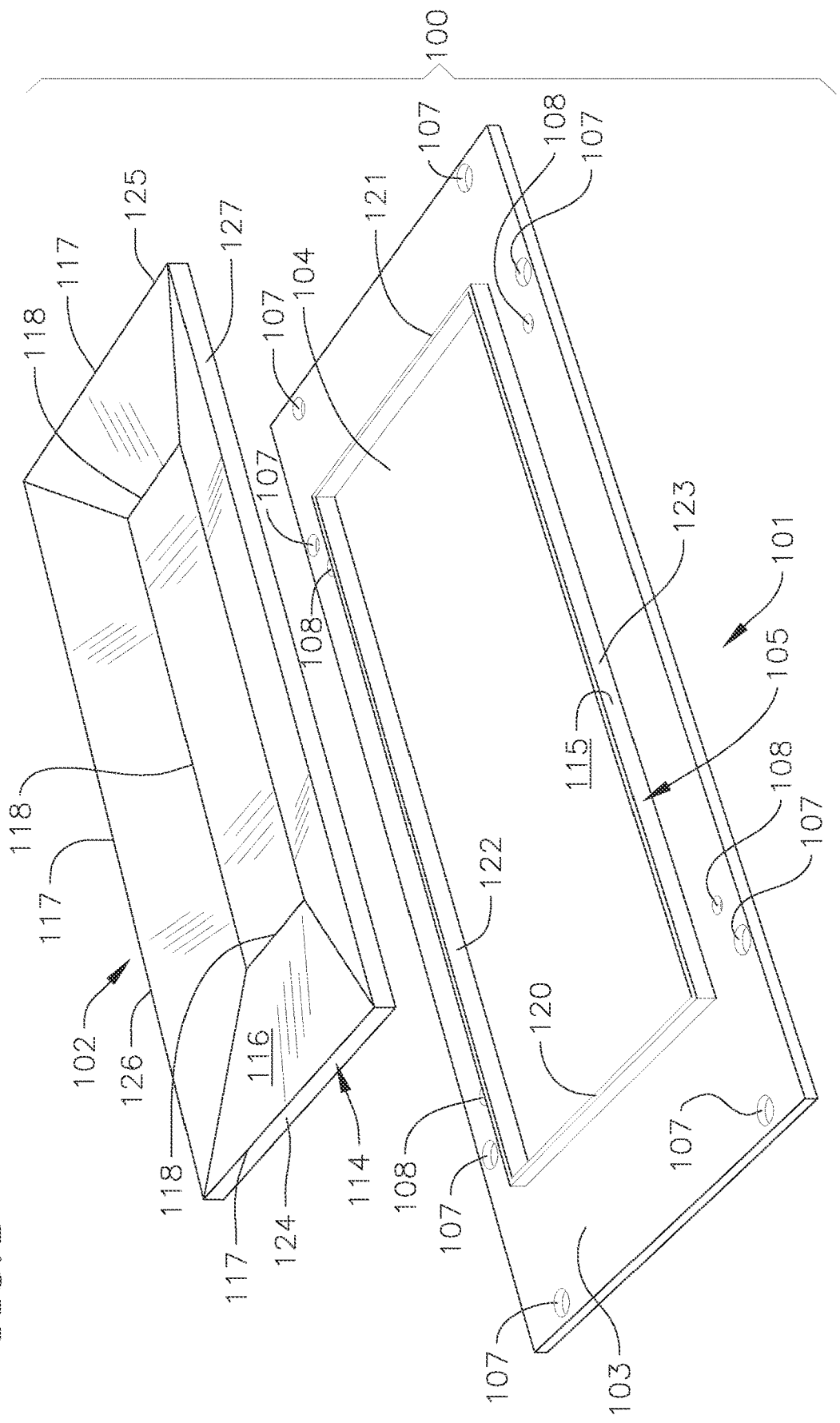
FIG. 2 is an exploded perspective view of a conversion frame according to another embodiment of the present disclosure.
Figure 3A:
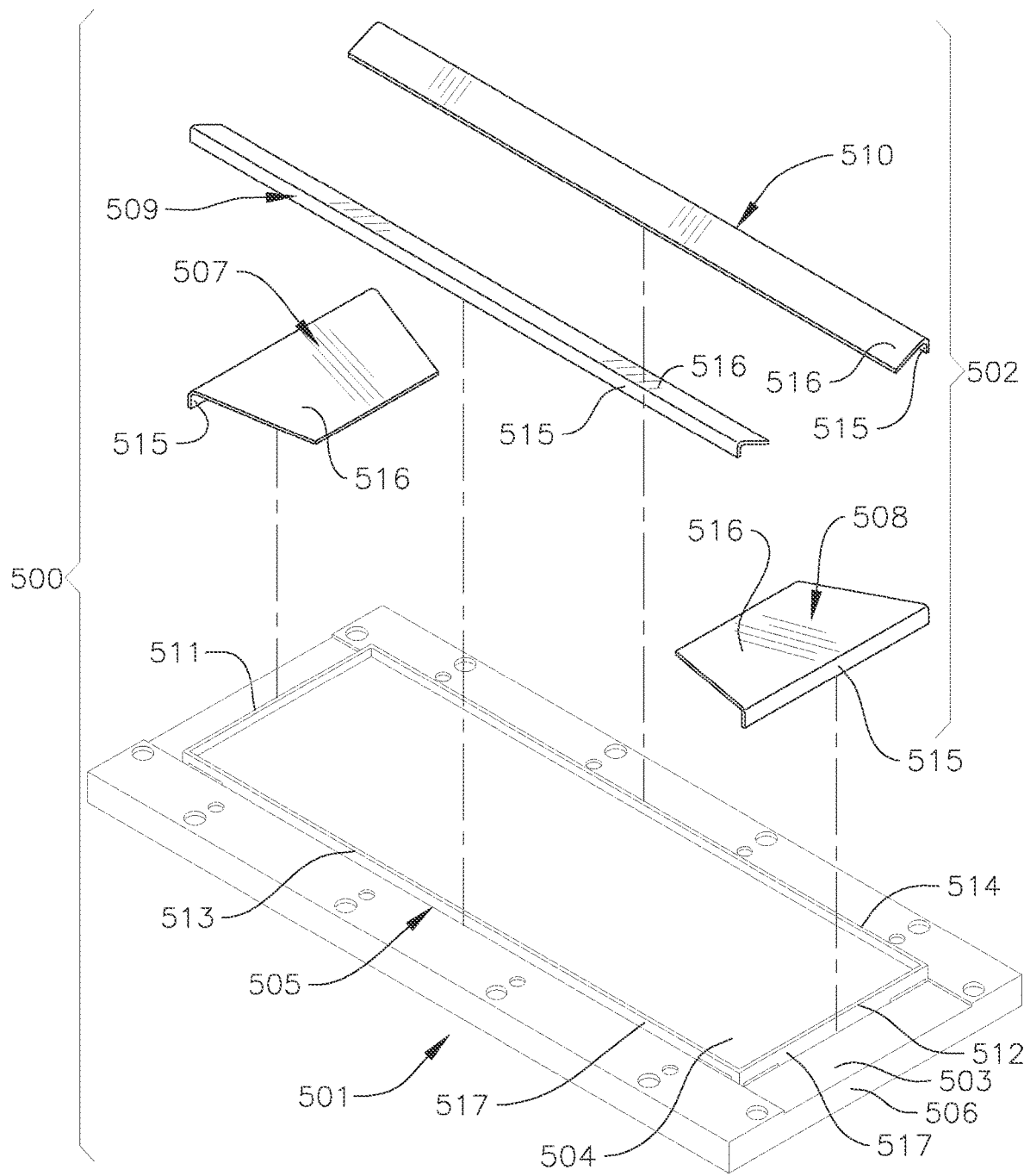
Figure 3B:
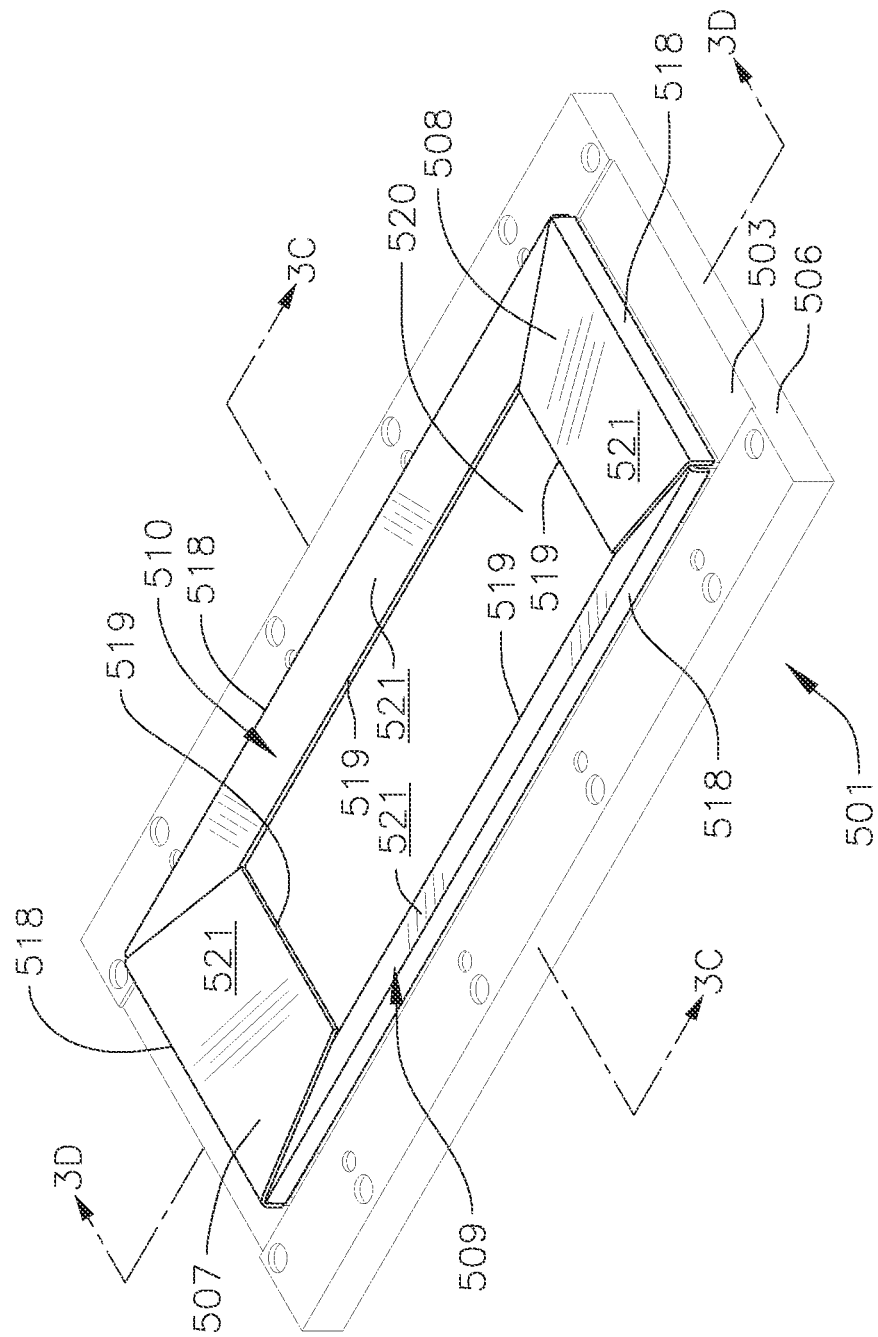

In one or more embodiments, the splash lip 402 of the UDC unit 400 may be removed prior to installation of the conversion frame assembly 100. In one or more embodiments in which the splash lip 402 of the UDC unit 400 is removed prior to installation of the conversion frame assembly 100, the frame 101 of the conversion frame assembly 100 may be provided without the standoff flange 106, as illustrated, for example, in the embodiment of the frame depicted in FIG. 2. In one or more embodiments in which the frame 101 is provided without the standoff flange 106, the base plate 103 of the frame 101 will be flush with the concrete pad 300 (e.g., the base plate 103 of the frame will be directly supported on the concrete pad 300) when the conversion frame assembly 100 is installed.

Additionally, in the illustrated embodiment, the conversion frame assembly 100 includes a series of brackets 109. The brackets 109 are configured to receive the fasteners (e.g., the concrete anchor bolts) securing the frame 101 to the concrete pad 300 and to reinforce the frame 101 at the connection points between the frame 101 and the concrete pad 300. In the illustrated embodiment, each of the brackets 109 is U-shaped and includes a base plate 110 and a pair of legs 111, 112 extending upward from opposite sides of the base plate 110. In the illustrated embodiment, the base plate 110 of each of the brackets 109 has an opening 113 (e.g., a hole) configured to permit one of the fasteners (e.g., one of the concrete anchor bolts) to pass through the base plate 110. In the illustrated embodiment, when the conversion frame assembly 100 is installed, the base plates 110 of the brackets 109 are supported on the concrete pad 300 (e.g., directly on the concrete pad 300) and the legs 111, 112 extend upward and contact an underside of the frame 101 at locations proximate to the first set of openings 107 in the base plate 103 of the frame 101 (e.g., the legs 111, 112 of each bracket 109 contact the base plate 103 of the frame 101 on opposite sides of a corresponding opening of the first set of openings 107). Additionally, in the illustrated embodiment, when the conversion frame assembly 100 is installed, the openings 113 in the brackets 109 are aligned or substantially with respective openings of the first set of openings 107 in the base plate 103 of the frame 101, and the fasteners securing the frame 101 to the concrete pad 300 extend through the first set of openings 107 in the frame 101, through the openings 113 in the base plates 110 of the brackets 109, and into the concrete pad 300. In one or more embodiments, the brackets 109 may have any other configuration suitable for reinforcing the frame 101 at the connection points between the frame 101 and the concrete pad 300.

The drainage tray 102 is configured to be connected to the splash lip 105 of the frame 101. In the illustrated embodiment, the drainage tray 102 includes a downwardly extending lip 114. The downwardly extending lip 114 of the drainage tray 102 is configured to overlap with at least a portion of the splash lip 105 of the frame 101 and contact an outer surface 115 of the splash lip 105 to connect the drainage tray 102 to the frame 101. In one or more embodiments, the downwardly extending lip 114 of the drainage tray 102 is connected to the splash lip 105 of the frame 101 with an adhesive. In one or more embodiments, the drainage tray 102 may be connected to the frame 101 in any other suitable manner, such as with fasteners. In the illustrated embodiment, an upper surface 116 of the drainage tray 102 slopes downward and inward. In the illustrated embodiment, when the drainage tray 102 is connected to the frame 101, the upper surface 116 of the drainage tray 102 slopes from a higher portion 117 at the splash lip 105 to a relatively lower portion 118 spaced inward from the splash lip 105). The upper surface 116 of the drainage tray 102 defines a weir configured to direct leaked fuel into the UDC unit 400.

Figure 1B:
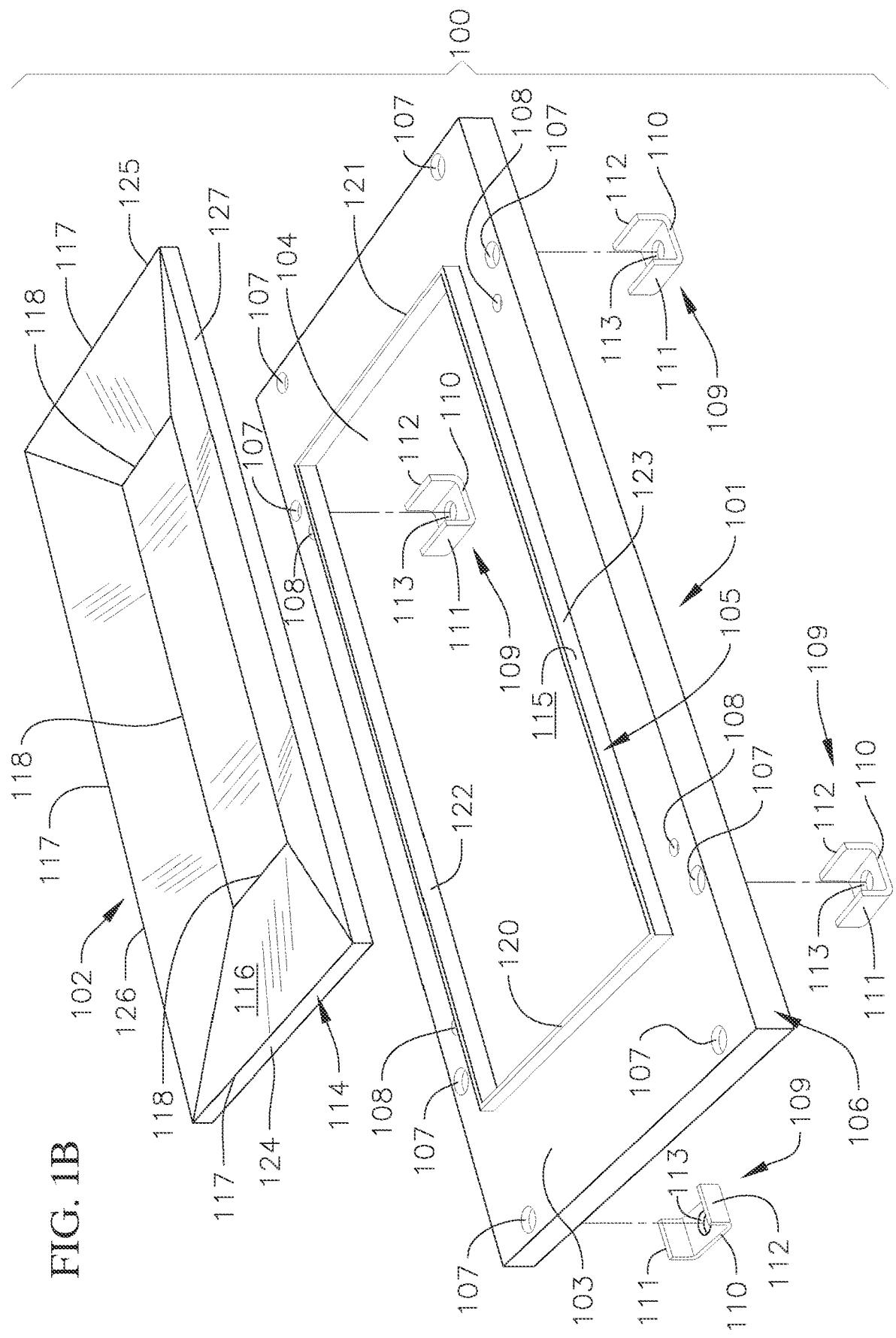
Figure 1C:
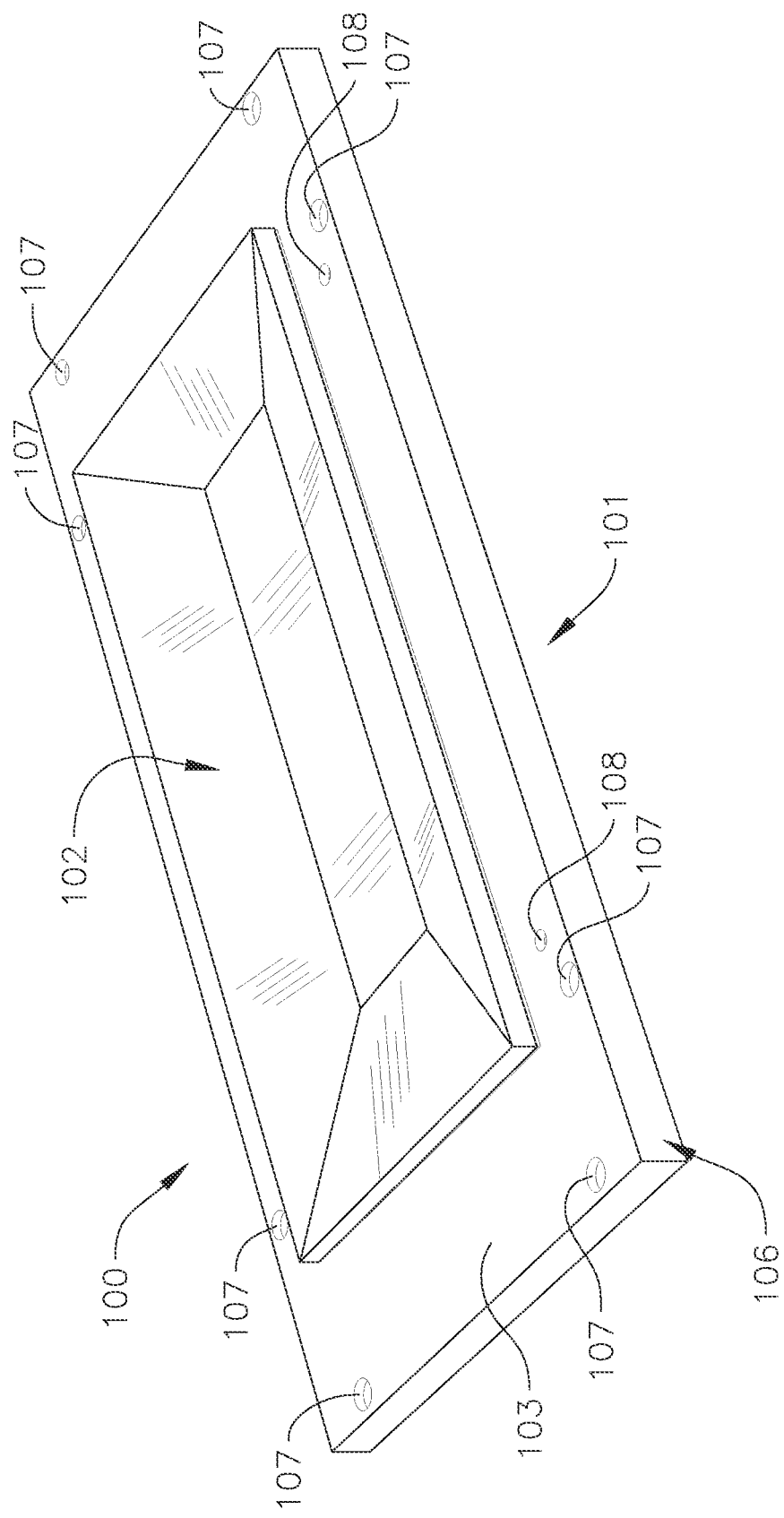
Figure 1D:
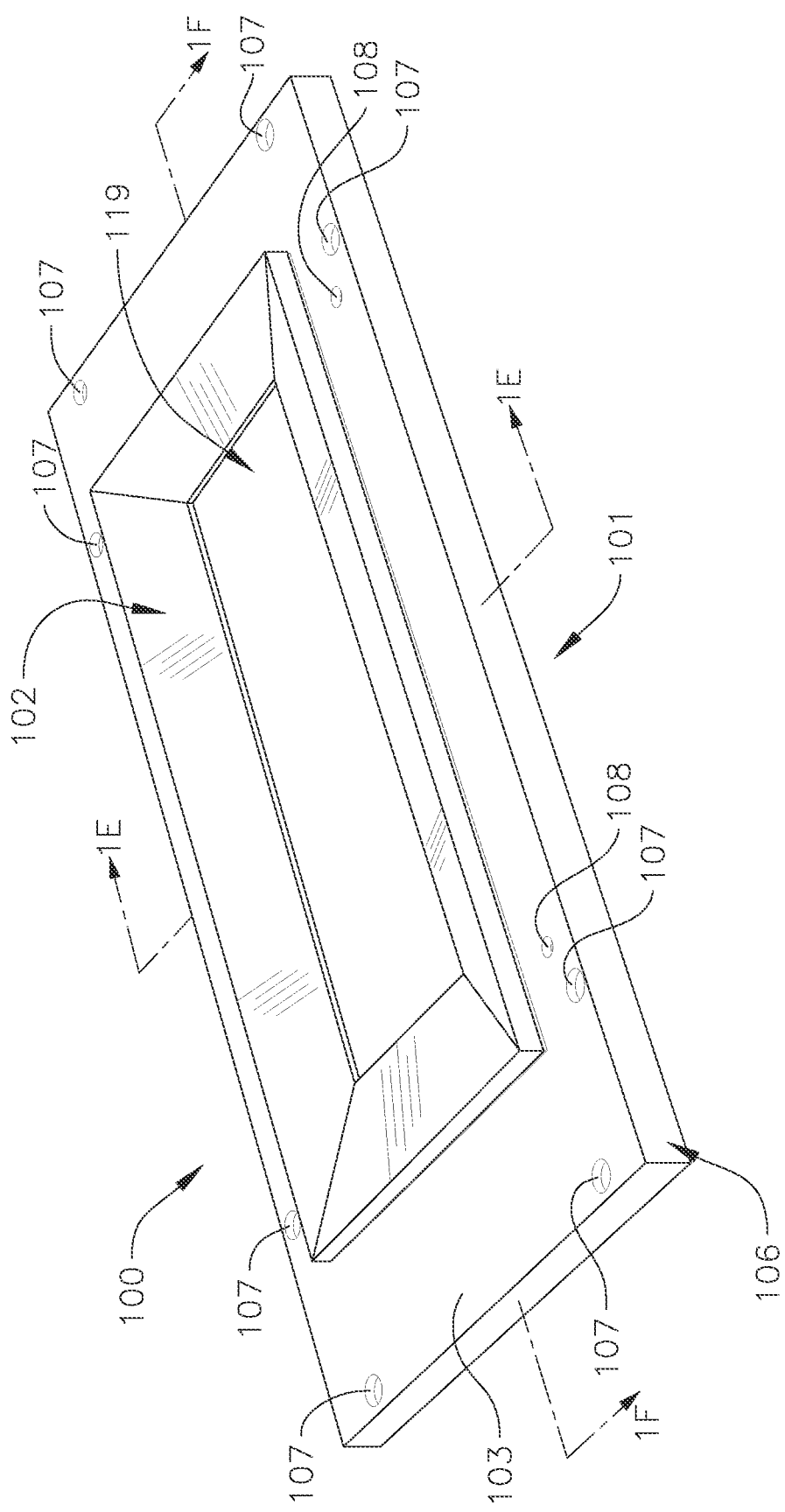

In one or more embodiments, an opening 119 (e.g., a hole) may be formed (e.g., cut) in the drainage tray 102 in situ during or following installation of the conversion frame assembly 100 (e.g., the drainage tray 102 may be initially provided without the opening 119 and the opening 119 may be cut to size in the drainage tray 102 during or following installation of the conversion frame assembly 100). FIGS. 1B-1C depict the drainage tray 102 before the opening 119 has been formed in the drainage tray 102, and FIG. 1D depicts the drainage tray 102 after the opening 119 has been formed in the drainage tray 102. In one or more embodiments, the drainage tray 102, or at least a portion thereof, may be made of any material susceptible to being cut in situ, such as, for instance, plastic. In one or more embodiments, the drainage tray 102, or at least a portion thereof, may be formed of thin sheet steel or fiber reinforced plastic (FRP). In one or more embodiments, the configuration (e.g., size and shape) of the opening 119 in the drainage tray 102 may be selected to correspond to the configuration (e.g., size and shape) of the open upper end 401 of the UDC unit 400. Forming the opening 119 in situ allows the technician to compensate for the relative sizes and positions of the fuel dispenser 200 and the UDC unit 400 (e.g., a lateral offset between the open upper end 401 of the UDC unit 400 and the fuel dispenser 200 and/or the smaller size of the UDC unit 400 compared to the fuel dispenser 200).

Once the opening 119 has been formed in the drainage tray 102, the sloped upper surface 116 of the drainage tray 102 is configured to direct leaked fuel 205 from the hydraulic cabinet 201 of the fuel dispenser 200 through the opening 119 in the drainage tray 102, through the fluid passageway 104 in the base plate 103 of the frame 101, and into the UDC unit 400 through the open upper end 401 of the UDC unit 400, as illustrated in FIG. 1A.

In the illustrated embodiment, the frame 101 and the drainage tray 102 each have a generally rectangular profile. In the illustrated embodiment, the splash lip 105 of the frame 101 has a rectangular profile including a pair of opposing end segments 120, 121 and a pair of opposing side segments 122, 123. Additionally, in the illustrated embodiment, the downwardly extending lip 114 of the drainage tray 102 has a rectangular profile corresponding to the rectangular profile of the splash lip 105 of the frame 101. In the illustrated embodiment, the downwardly extending lip 114 of the drainage tray 102 includes a pair of opposing end segments 124, 125 and a pair of opposing side segments 126, 127. When the drainage tray 102 is attached to the frame 101, the opposing side segments 126, 127 of the downwardly extending lip 114 engage the opposing side segments 122, 123, respectively, of the splash lip 105, and the opposing end segments 124, 125 of the downwardly extending lip 114 engage the opposing end segments 120, 121, respectively, of the splash lip 105. In one or more embodiments, the frame 101 and the drainage tray 102 may have any other suitable profile shape depending, for instance, on the configuration of the fuel dispenser 200.

The shape and size of the frame 101 is selected depending on the size and shape of the fuel dispenser 200 (e.g., the model of the fuel dispenser 200) with which the frame 101 will be used. In one or more embodiments, the base plate 103 of the frame 101 has a length in a range from approximately 40 inches to approximately 56 inches, and a width in a range from approximately 17 inches to approximately 27 inches. Additionally, in one or more embodiments, the splash lip 105 of the frame 101 has a length in a range from approximately 34 inches to approximately 48 inches, and a width in a range from approximately 10 inches to approximately 18 inches. In one embodiment, the base plate 103 of the frame 101 has a length of approximately 48 inches and a width of approximately 22 inches, and the splash lip 105 of the frame 101 has a length of approximately 41¼ inches and a width of approximately 14 inches. In another embodiment, the base plate 103 of the frame 101 has a length of approximately 48 inches and a width of approximately 23¾ inches, and the splash lip 105 of the frame 101 has a length of approximately 34¾ inches and a width of approximately 15⅞ inches. In one embodiment, the base plate 103 of the frame 101 has a length of approximately 48 inches and a width of approximately 24 inches, and the splash lip 105 of the frame 101 has a length of approximately 40¼ inches and a width of approximately 14¼ inches.

The frame 101 may be made out of any suitable material. In one embodiment, the frame 101 is made of stainless steel. The standoff flange 106, the base plate 103, and the splash lip 105 of the frame 101 may have any suitable thickness or thicknesses, such as, for instance, 12 gage, 16 gage, 3/16 inch, or combinations thereof.

With reference now to FIGS. 3A-3D, a conversion frame assembly 500 according to another embodiment of the present disclosure includes a frame 501 and a drainage tray 502 configured to be attached to the frame 501. In the illustrated embodiment, the frame 501 includes a base plate 503 defining a fluid passageway 504, a splash lip 505 extending upward from the base plate 503 and around the fluid passageway 504, and a standoff flange 506 extending downward from the base plate 503 and around an outer periphery of the base plate 503.

In one or more embodiments, the configuration of the frame 501 (e.g., the base plate 503, the splash lip 505, and the standoff flange 506) may be the same as or similar to the configuration of the embodiment of the frame 101 (e.g., the base plate 103, the splash lip 105, and the standoff flange 106) illustrated in FIGS. 1A-1F. In one or more embodiments, the configuration of the frame 501 may be the same as or similar to the configuration of the embodiment of the frame 101 illustrated in FIG. 2 (e.g., the frame 501 may be provided without the standoff flange 506).

In the embodiment illustrated in FIGS. 3A-3D, the drainage tray 502 includes a series of angled segments 507, 508, 509, 510. In the illustrated embodiment, the splash lip 505 of the frame 501 has a rectangular profile including a pair of opposing end segments 511, 512 and a pair of opposing side segments 513, 514, and the drainage tray 502 includes four angled segments 507, 508, 509, 510 configured to be connected to the splash lip 505 of the frame 501 in a rectangular configuration (e.g., the drainage tray 502 includes two opposing angled end segments 507, 508 configured to be connected to the opposite end segments 511, 512, respectively, of the splash lip 505, and two opposing angled side segments 509, 510 configured to be connected to the opposing side segments 513, 514, respectively, of the splash lip 505). In one or more embodiments, the drainage tray 502 may include any other suitable number of angled segments 507, 508, 509, 510 and the angled segments 507, 508, 509, 510 may be configured to be arranged in any other suitable configuration, depending, for instance, on the configuration (e.g., profile shape) of the splash lip 505 of the frame 501.

The angled segments 507, 508, 509, 510 of the drainage tray 502 may be made out of any suitable material. In one embodiment, the angled segments 507, 508, 509, 510 of the drainage tray 502 are made of stainless steel. The angled segments 507, 508, 509, 510 of the drainage tray 502 may have any suitable thickness or thicknesses, such as, for instance, 12 gage, 16 gage, 3/16 inch, or combinations thereof.

In the illustrated embodiment, each angled segment 507, 508, 509, 510 includes a downwardly extending attachment lip 515 and a drainage lip 516 sloping downward and inward from the attachment lip 515. The downwardly extending attachment lip 515 of each angled segment 507, 508, 509, 510 is configured to overlap with at least a portion of the splash lip 505 of the frame 501 and contact an outer surface 517 of the splash lip 505 to connect the angled segment 507, 508, 509, 510 to the frame 501 (e.g., attachment lips 515 of the angled end segments 507, 508 overlap and contact outer surfaces 517 of the ends segments 511, 512, respectively, of the splash lip 505, and the attachment lips 515 of the angled side segments 509, 510 overlap and contact outer surfaces 517 of the side segments 513, 514, respectively, of the splash lip 505). The angled segments 507, 508, 509, 510 may be connected to the splash lip 505 of the frame 501 in any suitable manner, such as with fasteners and/or adhesive.

In the illustrated embodiments, the drainage lip 516 of each angled segment 507, 508, 509, 510 slopes downward from a higher, outer end 518 proximate to the attachment lip 515 to a lower, inner end 519 spaced inward from the higher, outer end 518 and distal to the attachment lip 515. In one or more embodiments, the drainage lip 516 of each angled segment 507, 508, 509, 510 may slope downward at any suitable angle relative to an imaginary horizontal plane, such as an angle in a range from approximately 10 degrees to approximately 60 degrees.

When the angled segments 507, 508, 509, 510 of the drainage tray 502 are coupled to the splash lip 505 of the frame 501, the lower, inner ends 519 of the angled segments 507, 508, 509, 510 together define an opening 520 in the drainage tray 502 (e.g., a rectangular opening) and upper surfaces 521 of the drainage lips 516 of the angled segments 507, 508, 509, 510 cooperate to define a weir configured to direct or channel leaked fuel from the hydraulic cabinet 201 of the fuel dispenser 200 (see FIG. 1A) through the opening 520 in the drainage tray 502 and into the UDC unit 400 (see FIG. 1A) below the fuel dispenser 200.

The configuration of the angled segments 507, 508, 509, 510 may be selected depending on the relative sizes and positions of the fuel dispenser 200 and the UDC unit 400 (e.g., a lateral offset between the open upper end 401 of the UDC unit 400 and the fuel dispenser 200 and/or the smaller size of the UDC unit 400 compared to the fuel dispenser 200). The lengths of the drainage lips 516 may be selected depending on the size of the open upper end 401 of the UDC unit 400 relative to the size of the fuel dispenser 200. For instance, angled segments 507, 508, 509, 510 having relatively longer drainage lips 516 may be selected when the size disparity between the UDC unit 400 and the fuel dispenser 200 is relatively large, and angled segments 507, 508, 509, 510 having relatively shorter drainage lips 516 may be selected when the size disparity between the UDC unit 400 and the fuel dispenser 200 is relatively smaller. In this manner, the configuration of the frame 501 may be selected depending the configuration of the new fuel dispenser 200 (e.g., the model of the fuel dispenser 200) and only the configuration of the angled segments 507, 508, 509, 510 of the drainage tray 502 may be selected depending on the configuration of the UDC unit 400 (e.g., the configuration of the frame 501 may be selected independent of the configuration of the UDC unit 400).

Figure 4:
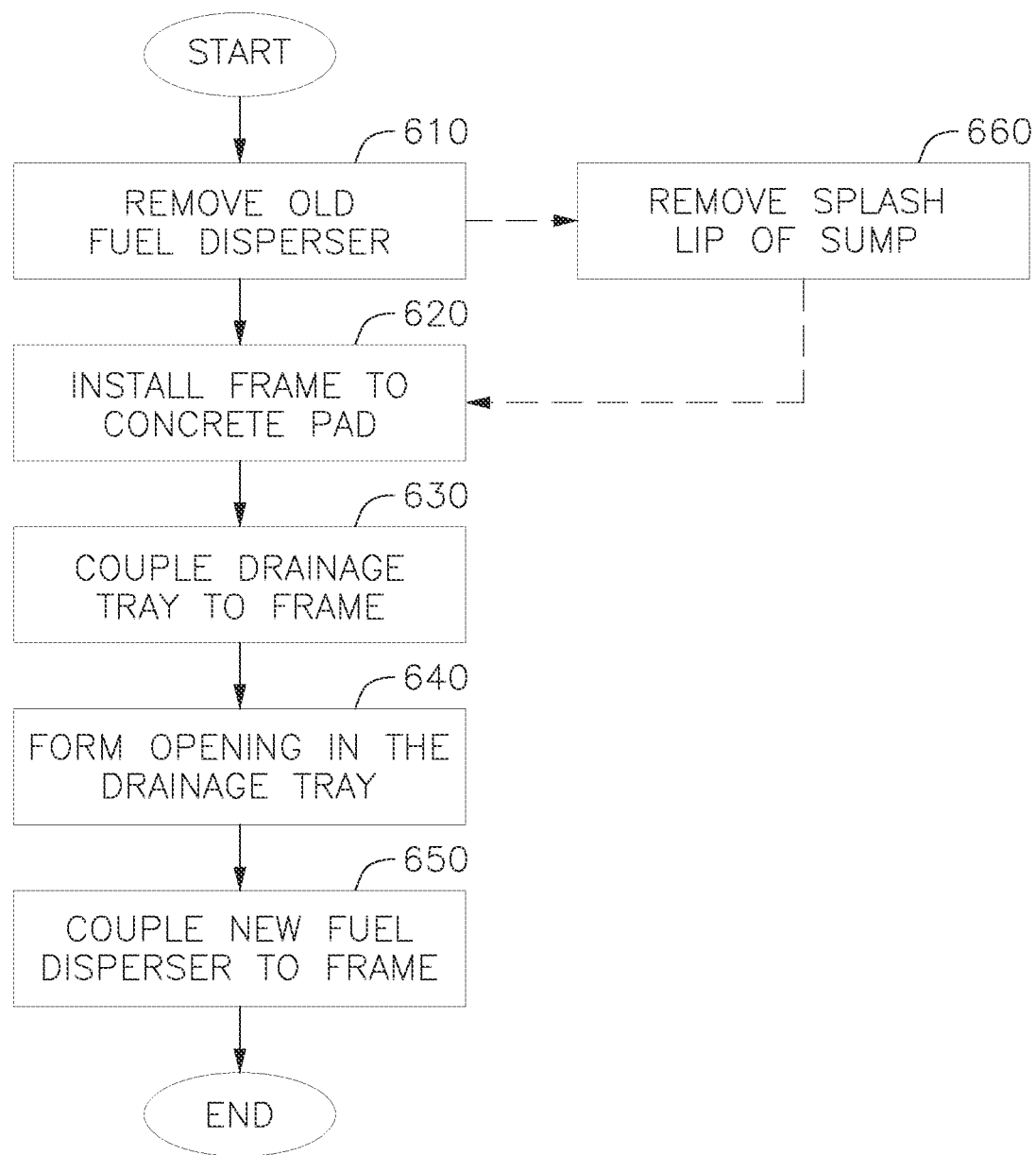
FIG. 4 is a flowchart illustrating tasks of retrofitting an existing sump to contain leaks from a new fuel dispenser according to one embodiment of the present disclosure.

FIG. 4 is a flowchart illustrating tasks of a method 600 of retrofitting an existing sump at least partially embedded in a concrete pad at a fueling station to contain leaks from a new fuel dispenser that is larger than an old dispenser for which the sump was designed. In the illustrated embodiment, the method 600 includes a task 610 of removing the old fuel dispenser (e.g., detaching the old fuel dispenser from the concrete pad). The method 600 also includes a task 620 of installing a frame of a conversion frame assembly to the concrete pad around the sump after the task 610 of removing the old fuel dispenser. The configuration of the frame may be the same as or similar to the configuration of the embodiment of the frame 101 illustrated in FIGS. 1A-1F. In one or more embodiments, the configuration of the frame may be the same as or similar to the configuration of the embodiment of the frame 101 illustrated in FIG. 2 (e.g., the frame may be provided without a standoff flange). In one or more embodiments, the frame includes a set of openings configured to receive fasteners (e.g., anchor bolts) securing the frame to the concrete pad.

In the embodiment illustrated in FIG. 4, the method 600 also includes a task 630 of coupling a drainage tray of the conversion frame assembly to the frame. The configuration of the drainage tray may be the same as or similar to the configuration of the embodiment of the drainage tray 102 illustrated in FIGS. 1A-1F. In one or more embodiments, the configuration of the drainage tray may be the same as or similar to the configuration of the embodiment of the drainage tray 502 illustrated in FIGS. 3A-3D (e.g., the drainage tray may include a series of angled segments 507, 508, 509, 510).

The method 600 also includes a task 640 of forming an opening in the drainage tray. The configuration of the opening in the drainage tray may be selected depending on the configuration (e.g., size and/or shape) of an open upper end of the sump. For instance, in one or more embodiments, the task 640 may include forming the opening having a shape and size that matches or substantially matches the shape and size of the open upper end of the sump. In one or more embodiments, the drainage tray may be formed of plastic or any other material susceptible to be cut in situ, and the task 640 of forming the opening may include cutting the opening in the drainage tray. In one or more embodiments, the drainage tray may include a series of angled segments and the task 640 of forming the opening may include selecting a configuration (e.g., shape and size) of the angled segments depending on the desired configuration of the opening.

In the illustrated embodiment, the method 600 also includes a task 650 of coupling the new fuel dispenser to the frame of the conversion frame assembly. As described above, once the conversion frame assembly is installed and the new fuel dispenser is coupled to the frame, the conversion frame assembly is configured to channel or direct fuel that leaks from one or more of the components in the hydraulic cabinet of the new fuel dispenser into the open upper end of the sump. In this manner, the conversion frame assembly is configured to contain the leaked fuel which might otherwise leak onto the concrete pad and/or into the ground due the size disparity between the new fuel dispenser and the sump, which was designed for use with the smaller, old fuel dispenser.

In one or more embodiments, the tasks of the method 600 illustrated in FIG. 4 may be performed in any other suitable order. For instance, in one or more embodiments, the task 640 of forming the opening in the drainage tray may be performed after the task 630 of coupling the drainage tray to the frame, although in one or more embodiments, the task 640 of forming the opening in the drainage tray may be performed before the task 630 of coupling the drainage tray to the frame. Additionally, not all of the tasks illustrated in FIG. 4 may be performed by the technician installing the conversion frame assembly. For instance, in one or more embodiments, the task 610 of removing the old fuel dispenser may be performed by a third party and/or may be performed before the technician arrives at the site. Additionally, in one or more embodiments, the technician who installed the conversion frame assembly may not perform the task 650 installing the new fuel dispenser to the frame.

Furthermore, in one or more embodiments, the method 600 may include a task 660 of removing a splash lip of the sump (e.g., removing the portion of the sump protruding out of the concrete pad) prior to the task 620 of installing the frame to the concrete pad. In one or more embodiments in which the method 600 includes the task 660 of removing the splash lip of the sump, the frame of the conversion frame assembly may be provided without the standoff flange (as illustrated, for example, in the embodiment of the frame depicted in FIG. 2) such that following the task 620 of installing the frame to the concrete pad, the base plate of the frame is flush with the concrete pad (e.g., base plate of the frame will be directly supported on the concrete pad).

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Although relative terms such as "inner," "outer," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "approximately," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present therebetween. Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

What is claimed is:

1. A conversion frame assembly configured to secure a fuel dispenser to a concrete pad and direct leaked fuel from the fuel dispenser into a sump at least partially embedded in the concrete pad, the conversion frame assembly comprising:

a frame comprising:
        a base plate defining a fluid passageway; and
        a splash lip extending upward from the base plate and extending around the fluid passageway in the base plate; and
    a drainage tray comprising a plurality of angled segments configured to be coupled to the splash lip of the frame,
        wherein, when the plurality of angled segments are coupled to the splash lip of the frame, the plurality of angled segments define an opening and upper surfaces of the plurality of angled segments cooperate to define a weir sloping inward and downward toward the opening.

2. The conversion frame assembly of claim 1, wherein each angled segment of the plurality of angled segments comprises an attachment lip and a drainage lip connected to the attachment lip, and wherein, when the drainage tray is coupled to the frame, the attachment lip of each angled segment is coupled to the splash lip of the frame, and the drainage lip of each angled segment extends inward and downward from the splash lip.

3. The conversion frame assembly of claim 2, wherein, when the drainage tray is coupled to the frame, the attachment lip of each angled segment of the plurality of angled segments overlaps the splash lip.

4. The conversion frame assembly of claim 3, wherein, when the drainage tray is coupled to the frame, the attachment lip of each angled segment of the plurality of angled segments contacts an outer surface of the splash lip.

5. The conversion frame assembly of claim 3, wherein, when the drainage tray is coupled to the frame, the drainage lip of each angled segment of the plurality of angled segments slops downward at an angle in a range from approximately 10 degrees to approximately 60 degrees.

6. The conversion frame assembly of claim 2, wherein the splash lip has a rectangular profile comprising a pair of opposing end segments and a pair of opposing side segments, and wherein each end segment of the pair of opposing end segments has a first length and each side segment of the pair of opposing side segments has a second length longer than the first segment.

7. The conversion frame assembly of claim 6, wherein the plurality of angled segments comprises a first pair of angled segments configured to be coupled to the pair of opposing end segments of the splash lip, and a second pair of angled segments configured to be coupled to the pair of opposing side segments of the splash lip.

8. The conversion frame assembly of claim 7, wherein a length of each angled segment of the first pair of angled segments is substantially equal to the first length, and wherein a length of each angled segment of the second pair of angled segments is substantially equal to the second length.

9. The conversion frame assembly of claim 1, wherein the base plate comprises a first plurality of openings configured to receive fasteners securing the frame to the concrete pad.

10. The conversion frame assembly of claim 9, wherein the base plate comprises a second plurality of openings configured to receive fasteners securing the frame to the fuel dispenser.

11. The conversion frame assembly of claim 9, further comprising a plurality of brackets configured to reinforce the frame at locations proximate to the first plurality of openings.

12. The conversion frame assembly of claim 1, wherein the frame further comprises a standoff flange extending downward from the base plate.

13. A method of retrofitting an existing sump at least partially embedded in a concrete pad at a fueling station to contain leaks from a new fuel dispenser that is larger or smaller than an old dispenser for which the sump was designed, the method comprising:
- installing a frame of a conversion frame assembly to the concrete pad around the sump; and
- coupling a drainage tray of the conversion frame assembly to a splash lip of the frame,
  - wherein the drainage tray comprising a plurality of angled segments, and
  - wherein the plurality of angled segments define an opening and upper surfaces of the plurality of angled segments cooperate to define a weir sloping inward and downward toward the opening.

14. The method of claim 13, further comprising removing a splash lip of the sump before the installing of the conversion frame assembly.

15. The method of claim 13, wherein:
- each angled segment of the plurality of angled segments comprises an attachment lip and a drainage lip connected to the attachment lip, and
- the coupling of the drainage tray to the splash lip of the frame comprises coupling the attachment lip of each angled segment to the splash lip, and
- the drainage lip of each angled segment extends inward and downward from the splash lip.

16. The method of claim 15, wherein the attachment lip of each angled segment of the plurality of angled segments overlaps the splash lip.

17. The method of claim 16, wherein the attachment lip of each angled segment of the plurality of angled segments contacts an outer surface of the splash lip.

18. The method of claim 15, wherein:
- the splash lip has a rectangular profile comprising a pair of opposing end segments and a pair of opposing side segments;
- each end segment of the pair of opposing end segments has a first length and each side segment of the pair of opposing side segments has a second length longer than the first segment; and
- the coupling of the drainage tray to the splash lip of the frame comprises coupling angled a first pair of angled segments of the plurality of angled segments to the pair of opposing end segments of the splash lip, and coupling a second pair of angled segments of the plurality of angled segments to the pair of opposing side segments of the splash lip.

19. The method of claim 18, wherein a length of each angled segment of the first pair of angled segments is substantially equal to the first length, and wherein a length of each angled segment of the second pair of angled segments is substantially equal to the second length.

20. The method of claim 13, wherein the drainage lip of each angled segment of the plurality of angled segments slops downward at an angle in a range from approximately 10 degrees to approximately 60 degrees.

* * * * *